UNITED STATES PATENT OFFICE.

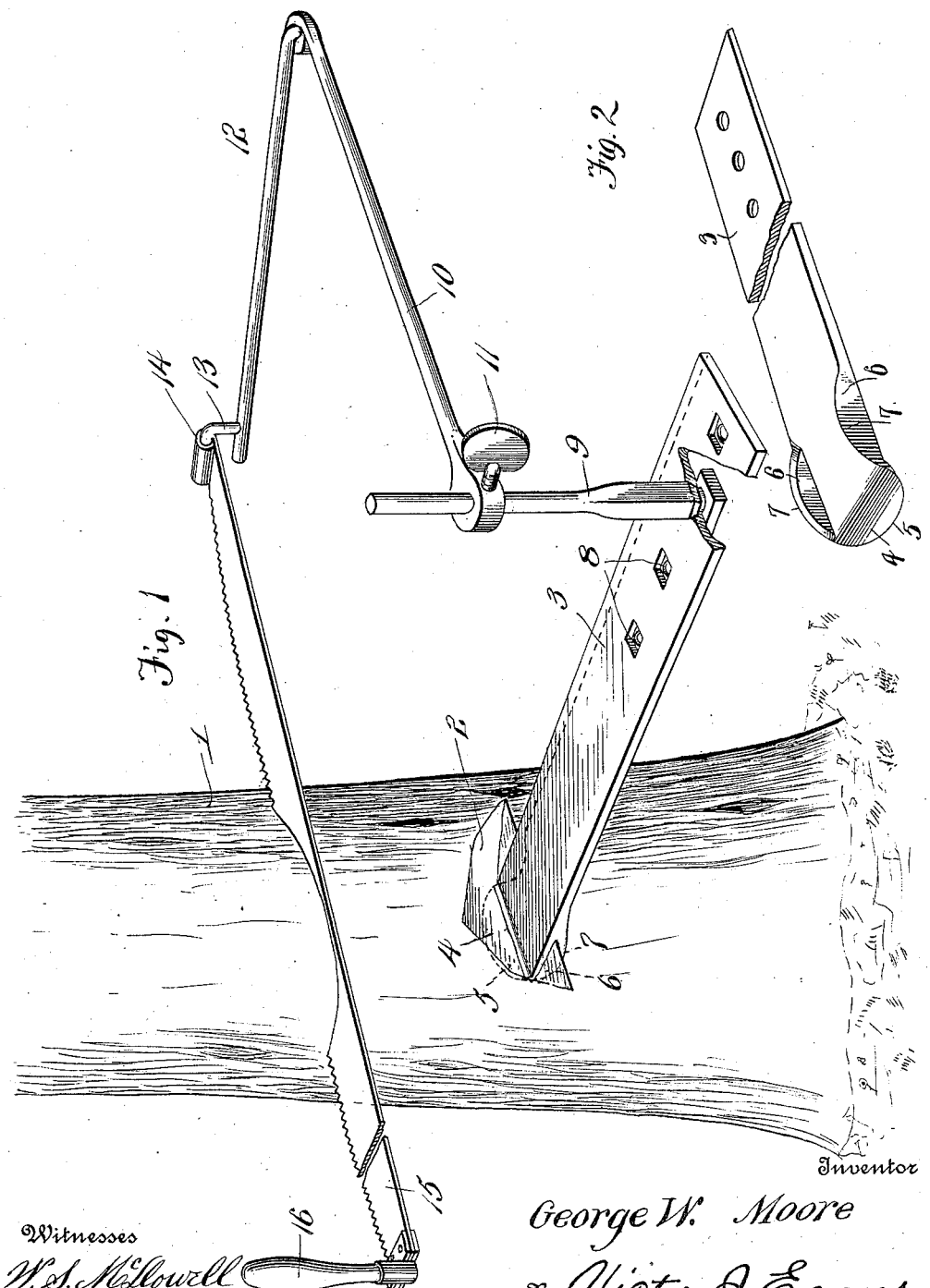

GEORGE WASHINGTON MOORE, OF FLORENCE LOGGING CAMP, SNOHOMISH COUNTY, WASHINGTON.

SAW-GUIDE.

1,093,458.  Specification of Letters Patent.  Patented Apr. 14, 1914.

Application filed October 3, 1911. Serial No. 652,617.

*To all whom it may concern:*

Be it known that I, GEORGE W. MOORE, a citizen of the United States, residing at Florence Logging Camp, in the county of Snohomish and State of Washington, have invented new and useful Improvements in Saw-Guides, of which the following is a specification.

This invention relates to saw guides and more particularly to a device of this character wherein the guide is supported directly upon the tree to be felled.

One of the principal objects of the invention is the provision of a simple and efficient device which may be conveniently supported upon the tree to be felled and in which the parts are so adjusted that the height of the cut may be readily determined and parts otherwise adjusted so that the saw may be held in proper position and can be operated by one man.

Further objects of the invention will appear as the following specific description is read in connection with the accompanying drawing, which forms a part of this application, and in which:—

Figure 1 is a perspective view of the device shown applied to a tree. Fig. 2 is a perspective view of a fragmentary portion of the bar.

Referring more particularly to the drawing, 1 represents a tree which is to be felled in which a notch 2 is formed having a horizontal lower wall and an inclined upper wall produced by chipping into the tree in the ordinary manner of felling with an axe. The saw guide comprises a mounting bar 3 having one end thereof provided with an upturned flange 4 which is sharpened to produce a cutting edge 5. At the sides of the bar adjacent the flange 4 depending flanges 6 are formed having cutting edges 7, the said depending flanges are disposed on the undersurface of the bar longitudinally thereof and at right angles to the upturned flange 4. The bar is applied to the tree by elevating the outer end and inserting it into the notch then pressing the same down to horizontal position which causes the knife edge 5 to bite into the upper wall of the notch 2 and the knife edges 7 to bite into the horizontal wall. By raising the outer end of the bar, the same may be readily removed from engagement with the tree.

A plurality of square holes 8 are formed in the bar which are tapered and which receive a vertically positioned standard 9 having a supporting arm 10 mounted therein and adjustably secured as to rotation and vertical movement on the standard by means of a set screw 11. The outer end of the arm is provided with an eye and pivoted therein for rotation or oscillation is an arm 12 having a right angular finger 13 projecting from its outer end and adapted to engage an eye 14 formed in the end of the saw blade 15. The opposite end of the saw blade is provided with an ordinary manipulating handle 16. The finger 13 is somewhat smaller than the eye 14 so as to permit the changes in the relative position of these parts.

It will be seen from the foregoing that the standard may be adjusted toward or away from the tree on the bar, and the arm 10 may be adjusted vertically or have its pivoted end adjusted toward or away from the tree, as desired. The first and last adjustment regulate the device so that the saw may engage the tree in the proper manner while the adjustment of the arm 10 vertically on the standard regulates the height of cut above the notch 2.

What is claimed is:—

1. A supporting bar for saw guides having an upturned knife edge at one end and depending knife edges at opposite sides and on the lower surface thereof and adjacent to the first knife edge.

2. A supporting bar for saw guides having an upturned knife edge at one end and depending knife edges on the lower surface thereof and adjacent to the first knife edge, said depending knife edges being disposed longitudinally of the supporting bar and at right angles to the upturned knife edge.

In testimony whereof I affix my signature in presence of two witnesses.

GEORGE WASHINGTON MOORE.

Witnesses:
W. E. YOUNG,
C. J. HAMILTON.

---

Copies of this patent may be obtained for five cents each, by addressing the "Commissioner of Patents, Washington, D. C."